US011525351B2

(12) United States Patent
Phillips

(10) Patent No.: US 11,525,351 B2
(45) Date of Patent: Dec. 13, 2022

(54) WELLBORE FRICTION MEASUREMENT, METHOD AND APPARATUS

(71) Applicant: Walter Phillips, Huntington Beach, CA (US)

(72) Inventor: Walter Phillips, Huntington Beach, CA (US)

(73) Assignee: Walter Phillips, Huntington Beach, CA (US)

( * ) Notice: Subject to any disclaimer, the term of this patent is extended or adjusted under 35 U.S.C. 154(b) by 68 days.

(21) Appl. No.: 16/946,232

(22) Filed: Jun. 11, 2020

(65) Prior Publication Data

US 2020/0370413 A1   Nov. 26, 2020

Related U.S. Application Data

(60) Provisional application No. 62/832,496, filed on Apr. 11, 2019.

(51) Int. Cl.
*E21B 47/007* (2012.01)
*E21B 47/09* (2012.01)
*G01N 19/02* (2006.01)
*E21B 19/00* (2006.01)

(52) U.S. Cl.
CPC ............ *E21B 47/007* (2020.05); *E21B 47/09* (2013.01); *G01N 19/02* (2013.01); *E21B 19/00* (2013.01)

(58) Field of Classification Search
CPC ............................... E21B 47/007; G01N 19/02
See application file for complete search history.

(56) References Cited

U.S. PATENT DOCUMENTS

| 3,216,245 | A | 11/1965 | Seed |
|---|---|---|---|
| 3,343,409 | A | 9/1967 | Gibbs |
| 3,355,938 | A | 12/1967 | Neely |
| 3,457,781 | A | 7/1969 | Elliott |
| 4,947,936 | A | 8/1990 | Ellwood |
| 5,182,946 | A | 2/1993 | Boughner |
| 5,252,031 | A | 11/1993 | Gibbs |
| 5,464,058 | A | 11/1995 | McCoy |

(Continued)

OTHER PUBLICATIONS

Downhole Measurement on Pumping Oil Wells G.D. Albert, Magnetic Peripherals Inc.; J.C. Purcupile, * U. of Oklahoma; and J.C. Chacin U, Intevep S.A. SPE 17010 SPE Production Technology Symposium, held in Lubbock, Texas, Nov. 16-17, 1987.

(Continued)

*Primary Examiner* — Daniel J Colilla

(57) ABSTRACT

An apparatus and method for measuring position and magnitude of downhole mechanical friction. The apparatus comprises sensors that reside along, or in-line with, a section of equipment that is installed or removed from a wellbore. The sensing device is configured measure relative to the wellbore during a work-over or other well intervention procedures where said section of equipment (tubing, rods, drill pipe, etc.) is installed in, or removed from, the wellbore. Recorded measurements are then processed to correct for dynamic forces to provide a measure of friction through the portions of the wellbore where said equipment travels. The sensing can be done near the source of friction, or at some distance through a mechanical connection. A method for determining depth and magnitude of downhole friction is also provided. Additionally, a method for applying the map of wellbore friction to the design and analysis of a rod actuated pump is presented.

17 Claims, 9 Drawing Sheets

(56) References Cited

U.S. PATENT DOCUMENTS

| | | | |
|---|---|---|---|
| 8,849,594 | B2 | 9/2014 | Mills |
| 9,810,214 | B2 | 11/2017 | Pons |
| 10,018,032 | B2 | 7/2018 | Pons |
| 10,260,500 | B2 | 4/2019 | Qi |
| 10,815,770 | B2 | 10/2020 | Moreno |
| 11,021,946 | B2 | 6/2021 | Puls et al. |
| 2017/0044849 | A1* | 2/2017 | Pitcher ............... E21B 3/045 |
| 2018/0045032 | A1 | 2/2018 | Suermondt et al. |
| 2019/0178059 | A1* | 6/2019 | Zheng ............. E21B 41/0092 |
| 2019/0203579 | A1 | 7/2019 | Phillips |
| 2019/0257176 | A1* | 8/2019 | Dykstra .......... E21B 41/0092 |
| 2020/0355063 | A1* | 11/2020 | Van Vliet ............. G06G 7/48 |
| 2020/0386092 | A1 | 12/2020 | Phillips |

OTHER PUBLICATIONS

An Oil-Well Pump Dynagraph Walton E. Gilbert API-36-094 Drilling and Production Practice, Jan. 1, 1936.

A Numerical Approach to the Diagnosis of Sucker Rod Pumping Installations and its Verification With Downhole Pump Field Measurements J.E. Chacin, Intevep S.A. SPE 18829 SPE ProduorionOperations Sympoaiimrheld in Oklahoma City, Oklahoma, Mar. 13-14, 1989.

Insights From the Downhole Dynamometer Database John R. Waggoner SAND97-0223C https://www.osti.gov/servlets/purl/456351.

New CD-ROM available free from Sandia National Laboratories reveals nitty gritty details of downhole oil well environment https://www.sandia.gov/media/dynamo.htm.

Downhole Dynamometer Tool Glenn D. Albert Proceedings of the Forty-First Annual Meeting of the Southwestern Petroleum Short Course, Lubbock, TX, Apr. 20-21, 1994.

"Modeling a Finite-Length Sucker Rod Using the Semi-Infinite Wave Equation and a Proof to Gibbs' Conjecture" (SPE-108762-PA-P), published March 2009.

* cited by examiner

WELLBORE FRICTION MEASUREMENT, METHOD AND APPARATUS

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present disclosure relates to the field of hydrocarbon recovery operations. More specifically, the present invention relates to the production of fluids to the surface using rotational or reciprocating rod actuated artificial lift. The invention also relates to an apparatus for measuring downhole mechanical friction in a wellbore, and a method for utilizing that friction knowledge to improve well operations.

TECHNOLOGY IN THE FIELD OF THE INVENTION

To prepare a wellbore for the production of hydrocarbon fluids, a string of production tubing is run into the casing. The production tubing serves as a conduit for carrying production fluids to the surface. A mechanically actuated downhole pump is installed at the bottom of the tubing. A rod-string, extending from surface, is attached to the downhole pump. The rods are then actuated at surface to lift fluid from the downhole pump, up through the tubing, to surface.

The production of hydrocarbon fluids using a sucker rod pump, or a progressing cavity pump, creates friction and wear as the rods reciprocate up and down, or rotate, within the production tubing. Those of ordinary skill in the art will understand that most wells are not perfectly vertical but can have path deviations. Such deviations may be in the form of a gentle corkscrew created as a largely unavoidable result of forming the wellbore using a rotating drill pipe and bit. Other such deviations may be intentional to reach reservoirs from a specific surface location. These path deviations cause the rods to be deflected into the tubing, which causes friction and wear. Friction and wear have serious adverse effects on the operation of rod actuated wells. Directional or horizontal wells are increasingly common and present difficulties, with respect to friction, when producing via a rod or progressing cavity pump.

The presence of wellbore deviations can impart a side-load on the rod-string, resulting in friction and wear at points of wellbore deviation. In order to accurately diagnose the performance of a rod actuated well, it is desirable to thoroughly understand the friction present in the given well. Likewise, a detailed understanding of the friction present can help to better design the downhole assembly.

Oil and gas wellbores are drilled in a manner that results in intentional, or unintentional, path deviations. Wellbores are surveyed by obtaining "instantaneous" trajectory information at various depths. These distinct trajectory measurements are then computed to spatial coordinates, from which the overall wellbore path through 3-dimensional space is indirectly calculated. There are errors inherent in this surveying process, but for overall wellbore placement and location, this general method suffices. In a rod (or progressing cavity) pumped well, the steel or fiberglass rods slide through production tubing, which itself is placed in the wellbore, further introducing subtle path deviations.

Survey methods through the axial centerline of the wellbore may differ slightly from the actual path of the rods when placed in casing and further inside of the production tubing. Furthermore, the true path through 3-dimensional space may be more complex than can be obtained through instantaneous tangential measurements taken at coarsely spaced intervals. Drilling surveys generally do not provide high enough resolution to identify subtle and localized path deviations that influence rod-on-tubing friction. Alternatively, high resolution post-drill gyro surveys present a significant improvement but are still susceptible to compounding measurement or calculation errors and may not be accurate enough to thoroughly determine contact points from the calculated path. Post-drill surveys also require the well to be taken off production while the work is preformed, which adds to the overall cost of such a survey. These survey methods still result in an indirect, and potentially inaccurate, calculation of downhole friction.

Wellbore surveying, for the purposes of geometric representation, is done by sampling the directional components at several locations in the wellbore. These are the horizontal component of direction, known as "azimuth" or compass heading, and the vertical component of "inclination", or the angle from true vertical. The composition of the horizontal and vertical angles gives a direction in 3-dimensional space. The distance between the adjacent samples is directly measurable along the wellbore and is referred to as "measured depth". The samples, or survey locations can then be converted to Cartesian coordinates through several mathematical approaches. Of note is that these mathematical models assume a large smooth semi-circle between adjacent samples. Furthermore, the absolute Cartesian coordinates are reliant on previous calculations, meaning that any errors in the survey measurements, or "smooth circle" assumption, will compound with increasing depth. These errors are tolerable for overall wellbore placement where errors of a few feet are acceptable. These errors become problematic when used to determine precise and detailed deviations, on the scale of inches or less, that cause rod-on-tubing friction.

Wellbore path deviations create rod on tubing contact, resulting in friction at distinct points along the rod-string. Spatial coordinates derived from the wellbore surveys are used to identify these frictional contact points. A side-load value is further calculated from rod tension, which varies with depth, dynamic forces, and friction present elsewhere along the rod-string. The fundamental flaw in existing methodologies is that friction values necessary for equipment performance analysis are derived from indirectly calculated geometry, not by direct measurement of that friction. Wellbore geometry is derived from trajectory samples composed of azimuth and inclination, which may be flawed, or may differ slightly between casing, tubing, and rod paths. Any errors in the measurements or the multi-step calculation process can compound, resulting in incorrect friction and side-loading values. Furthermore, the interaction between tension, gravity, and wellbore geometry is not thoroughly understood from these survey methods. A more direct method of measuring actual wellbore friction is needed.

BRIEF SUMMARY OF THE INVENTION

Errors in the wellbore positional survey result in errors in the frictional model derived from that survey. A need exists to provide a direct measurement of friction in the wellbore that approximates or replicates actual pumping conditions. A method and apparatus are presented that can measure friction, both directly and at a distance, in a wellbore. Knowledge of wellbore friction can guide the selection of downhole components to address this friction. Additionally, a better understanding of downhole friction can improve the design and analysis of pumping wells.

Well servicing, including work-over (installing and removing the rods and/or tubing), wireline operations, drilling, etc., probe out the wellbore with lengthy physical equipment that is mechanically attached to some surface mechanism. Of importance is the lengthy equipment sliding through the wellbore, exposed to friction caused by path deviations. In some respects, the work-over process is similar to the concept of a rod pumped well, where a length of steel rods is mechanically attached to a surface pump-jack, extending all the way to the downhole pump. There are however some distinct differences, for example the lack of a cyclic loading, and the nature of installing or removing equipment significantly differs from normal pump-jack operation. Work-over service rigs also differ from pump-jacks in the lack of specific instrumentation necessary to gather measurements during normal operations to perform the calculations for identifying downhole conditions. Still, the work-over process affords an opportunity to observe friction acting at varying depths as equipment is installed or removed, which is not possible in a pumping well configuration.

Effectively measuring the friction due to varying tension during these work-over or wireline processes can provide a map of the wellbore friction. This more closely approximates the operating well conditions than the calculated, and inferred methods based on wellbore geometry through directional surveys. Furthermore, these work-over or wireline operations already take place at various times during the life of a well. A sensing device to take measurements during these operations and a method to process the gathered data from that operation can identify friction at depths along the wellbore.

Dynamic conditions during the process of handling rods, or wireline, complicate the measurement because actual loads are obscured by accelerations and stretch of the material (rods or cable/wireline) between the point of measure, and any other point along the rod or cable. Fortunately, a method for dealing with these dynamic conditions exists in the operation and diagnostics of running rod pumped wells. This method was pioneered in the 1960's by Sam Gibbs (U.S. Pat. No. 3,343,409) and is commonly known as the Wave Equation. The wave equation is a broad mathematical method that can apply to many fields. As it pertains to rod pumped wells specifically, the method is used to analyze (or to predict) a single stroke of the pumping unit. Using measured surface load and position data, this method calculates the conditions at the bottom of the rod-string by eliminating dynamic conditions in the system such as accelerations, rod stretch, viscous fluid damping, etc.

The wave equation method, as currently used in the industry, does not sufficiently handle mechanical sliding friction such as rod-on-tubing contact. Gibbs points out that any errors in the friction model will be present in the resulting calculated load and position values at the far end of the rod-string. This is known as the Gibbs Conjecture. In practice, when the wave equation is applied to analyzing wells with friction, the resulting analysis includes, but does not identify, that friction in the resulting load and position values at the far end of the rod-string. Unaccounted friction distorts the analysis, as these calculated loads and positions are not truly felt at the far end of the rod-string (i.e. the pump). Distortion in the calculated downhole conditions makes analysis difficult, and in some cases impossible. It is therefore desirable to account for this friction to both analyze downhole conditions and understand where to address contact points along the wellbore.

The phenomenon of friction being carried along in the calculations as the "Gibbs Conjecture" shows can be used to our advantage if multiple data sets can be obtained at varying depths. In other words, if the frictionally exposed rods were varied in length to experience friction over different sections of the wellbore. Fortunately, just such a procedure to "probe out" the well bore at varying depths already takes place during work-over operations where the rods (or tubing) are removed or installed in the wellbore. Sections of rods (or tubing) are sequentially pulled out of (or installed in) the wellbore. This is similar to the "stroking" action that takes place in an operational rod pumped well, although the stroke does not cyclically return to the same starting position, as equipment is being installed or removed. Nevertheless, the stroking action of the work-over rig can be processed with a modified Wave Equation implementation to suit the different mode of a work-over compared to an operational/pumping well. Subsequent "strokes" of the rods can then be compared with differing lengths of wellbore contact to uncover friction acting at different depths.

The act of pulling or installing rods results in a partial "stroke" where the rods travel in one direction and then stop while the rig crew reconfigures the tooling for the next "stroke". When pulling rods, the rig "up-strokes" the rods. Likewise, when installing, the rig "down-strokes" the rods. In an operational well a single stroke involves both an upstroke and a down-stroke where the surface stroke oscillates between a fixed maximum and minimum position. From a mathematical perspective, the direction of the stroke, or "completeness" of the cycle is largely irrelevant, only that enough data, at a sufficient sample rate, is obtained for the calculations to stabilize.

The rig operation also differs from a typical operational well, as there is no cyclic fluid load applied to the far end of the rod-string by way of pump action. Fortunately, an "unloaded" rod-string is a thoroughly understood condition. In a running well, this can manifest as a rod part (where the rods break at some depth) or if the pump valves become stuck open. In this condition, the load at the bottom of the rod-string is known to be zero because there is no external load applied by way of pump action lifting fluid on the upstroke. The rods are free to oscillate, like a hanging slinky, except for friction, which is what we wish to measure.

Utilizing the Gibbs conjecture, when we calculate the load and position at the bottom of the rods, non-zero calculated loads will indicate friction somewhere along the entire rod-string, although it is not yet known where that friction is acting, only the cumulative frictional effects are known. Downhole position, in addition to load, is also affected but is less of a concern in this scenario as we are primarily interested in identifying loads that are a result of friction along that exposed section of rods. Furthermore, frictional induced tensile loads are dependent on the normal force applied to the point of friction, which itself is a result of additional tensile loads due to friction that may be present below that point. We cannot, at this stage, identify where the friction is acting, or how substantial any specific frictional region is, only the cumulative affect over that length of rods under measurement.

To obtain friction measurements at all depths, the work-over operation removes a section of rods, and the calculation can be repeated based on the new shorter total rod length remaining in the wellbore. Again, friction present in the calculated data is acting somewhere along the rod-string, but this new value does not include friction in the lower wellbore section compared to the previous "sample". The rods have been lifted within the wellbore by a known amount and that equivalent number of rods has been removed from the top of the rod-string. This process can be repeated up (or down, when installing equipment) the wellbore for a measure of friction acting at different depths. In a perfectly frictionless wellbore, each calculated downhole load value (at each sampled depth) at the bottom of the rod-string would be zero. In a wellbore with distinct friction acting at a specific depth, the sequence of calculated load values for each rod section, following Gibbs Conjecture, would show changing load variation (from zero at the bottom of the rod-string) leading up to that depth where the distinct friction is acting. As the bottom of the rod-string passes the point of friction, that friction no longer can influence the calculations, and thus can be identified by a depth at which that frictionally induced load value diminishes.

Complicating factors such as partially filled tubing, causing varying rod buoyancy, can be corrected for through other means such as a fluid level survey. The rig crew can also be instructed to make multiple "strokes" at specified depths of interest to obtain more measured data to process. The rig crew can also be instructed to pull the rods in a prescribed fashion to further derive additional information about the wellbore and is discussed below. Because the sensing device is unobtrusive, the data can be gathered on each job where equipment is installed or removed. This means that multiple data sets can be obtained over the life of the well. These additional data sets can help increase the resolution and accuracy of the friction map derived by the method disclosed herein.

It is mostly assumed that wellbore paths do not change, but in practice, shifting conditions in the earth can alter the wellbore. An earthquake for example may introduce a new deviation in a wellbore that was not present when originally surveyed. While it is thought to be rare, this type of condition does occur. The invention disclosed herein can help identify this condition and a decision to resurvey the wellbore can be made.

Predictive vs. diagnostic approach: The Wave Equation methods work both in the diagnostic (top down) form, and the predictive (ahead in time) form. There are 4 boundary conditions at play: Surface Load, Surface Position, Pump Load, and Pump Position. Pump load and position refers to the bottom of the rod-string. The diagnostic approach uses the 2 boundary conditions of Surface Load & Surface Position to calculate Pump Load & Pump Position. The diagnostic approach utilizes measured surface load and position. The predictive method, however, utilizes assumed (or predicted) surface position and estimated pump load based on the fluid properties to calculate the remaining conditions of surface load, and pump position.

Given the knowledge that the load at the far end (bottom) of the rod-string while installing or removing rods, is zero, a predictive data set based on the surface motion and zero downhole pump load can provide a dynamic comparison of predicted vs. measured surface loads. The predicted surface loads include no friction, whereas the measured surface loads (measured on the work-over rig by the apparatus discussed below) include friction acting along the rods currently in the hole. These predicted and measured surface loads can be compared again to obtain a friction map along the wellbore. Comparing predicted and measured loads in this way includes dynamic loads. Again, the rig crew can be instructed to pull the rods in a manner that minimizes the dynamic loading to uncover additional information and is discussed below. Pulling the rods very slowly at a constant speed would accomplish this. This does not have to be done over the entire work-over process, but can be done periodically, or at specific depths of interest. Load and position gathered during normal (fast) rig operations should suffice. The "slow pull" is an optional procedure that can achieve additional measurements but is not required.

A "slow pull" procedure could be adapted to a pumping well configuration by utilizing a variable frequency drive (VFD), sometimes referred to as a variable speed drive. The important distinction between implementing a slow pull on a pumping well compared to a work-over service rig is that the pumping well can only probe out a single length, namely the entire rod-string. While it is possible to identify multiple distinct friction locations in such a configuration, it is more likely that only the most severe friction point would be identified. The work-over configuration, however, allows for multiple depths to be tested, and thus multiple friction points may be identified. An automated slow-pull procedure on a pumping well may beneficially identify changing downhole friction, which itself may indicate impending failure, or if caught early enough, may prescribe mitigating factors such as chemical based lubrication or corrosion inhibitors. Increasing friction may also be an indication of a failed rod rotator mechanism.

Static and dynamic friction: Much of the above discussion involves the assumption of dynamic friction; that is friction acting on a moving body. Static friction acts on a body at rest and because of rod stretch and dynamic conditions, the local velocity at a given depth may be different from that at surface. This static-to-dynamic friction transition typically only manifests as an observable load variation at surface when the rods are moving substantially slowly. This is not always possible in an operating rod well as the stroke speed is dictated by mechanical equipment and pump action drastically varies applied load. A work-over rig can pull the rods very slowly, which presents an opportunity to measure static and transitional friction (also referred to as Stribeck friction) acting at a specific depth by observing load increases corresponding to a load vs. position plot that is a result of the elasticity of a distinct section of rods present between the point of measure and the frictional resistance.

In a frictionless well, when pulling the rods very slowly and at a constant rate, the measured loads should not vary. In a case where static friction is acting at a depth, the measured loads will increase at surface, if the rods are held by friction downhole at a specific depth. That load increase is directly related to the rod stretch between these points and can be backwards calculated to a depth (or total rod length) using Hooke's law. The magnitude, or severity, of that friction can be obtained from the height of a "stretch" plot obtained by this surface load vs. position data as the rods stick and slip at some point downhole.

When the tension overcomes the restriction caused by a static downhole friction point, the downhole section of rods will begin to move, and the friction will transition from static to dynamic. This depth can then be obtained at surface by observing the load increase over a corresponding elongation, and applying Hooke's law to determine the corresponding elasticity constant, which in turn corresponds to a specific length of steel rods (i.e. corresponding to a specific depth from surface). The rig crew can be instructed to periodically perform a "slow pull" at specific depths to obtain detailed measurements pertaining to static friction. Provided enough onboard processing capacity of the sensing device, the results of this "slow pull" can be immediately reported to the rig operator. Gathered data may be processed on-site, or post-processed offsite after the work-over is completed. Again, the common case is to perform the work-over as normal and process the dynamic data. This "slow pull" procedure, however, is an additional option that can be interleaved strategically to obtain additional static data that is otherwise unobtainable.

Additional discussion, alternate methods: The method discussed above deals with traditional work-over methods where a distinct section of rods is physically removed (or installed) and repeated. Existing implementations of the Wave Equation assume a fixed rod weight and length during a given stroke. In other words, the rod length and weight does not change during the algorithm, as currently implemented and understood in the industry. This fits nicely with the work-over operation where the Wave Equation inputs only need to be updated between each subsequent and distinct "stroke" rather than constantly during the dynamic phases of that entire process. This requires only minimal modifications to existing computational methods. Other operations such as wireline, sand-line, or continuous rod, add or remove material continuously. In other words, when running a wireline downhole, the length and weight, as seen from surface, is continually changing, as is the elasticity of the entire section. The wave equation algorithm can be modified to account for this added complexity but is a substantial change to existing implementations and assumptions. The general method of observing surface load and position can therefore be applied to any operation that installs or removes lengthy equipment in the wellbore. This includes continuous rods, continuous tubing, drill pipe, cable, etc. in addition to standard fixed-length sucker rod or tubing sections.

The discussions above involve obtaining load and position measurements at surface, but this can be applied anywhere along the rod-string or wellbore. In particular, a load-cell can be attached to some weight and run down the wellbore, gathering load samples along the way. This is similar to the discussion above where load measurements are taken at surface. With a downhole tool, the measurements are taken closer to the potential source of friction. Dynamic effects such as rod-stretch are less significant in this case, as the distance between the friction source and measurement is reduced. The location and magnitude of friction points can be more precisely identified in this configuration. Multiple readings from both surface and downhole tools can be obtained and synchronized to provide a more accurate view of wellbore friction.

The general procedure for measuring load and friction in a traveling downhole device is to attach some lengthy section of weights that approximate a section of rods. In fact, the rods themselves can be used. An example would be to use 100 ft of 1.5-inch sucker rods suspended below the downhole tool, which would register approximately 1200 LBS as seen by the sensing device. The wireline, or sand-line, etc., would be attached to the top of the sensing device. The assembly would then be run downhole while the sensing device load and position (or distance traveled/depth) are logged. In a perfectly vertical, frictionless well, the weight of that 100 ft section is approximately 1200 LBS. If pulled at a constant speed, in the absence of friction, the weight seen by the downhole sensing device would be 1200 LBS. Dynamic accelerations of that mass will vary the load recorded, but that dynamic measured load can be corrected for and normalized with corresponding time synchronized positional data. Any friction encountered by that 100 ft section will vary the load but cannot be corrected for given acceleration data. Therefore, comparing the ideal loading against measured load readings (normalized for dynamic motion) while traveling along the wellbore, can indicate the location and relative severity of the friction. The length and weight of the traveling rod section can be selected to better measure the effects of friction in a given wellbore geometry. A longer section may be optimal if the interaction between multiple friction points is of interest. The entire rod length is one such case and is discussed above when measured from surface. The general concept of measuring load at the top of a rod or tubing section is identical; the specific implementation of the measurement apparatus may vary due to external physical and mechanical constraints.

A further addition to the traveling downhole load measurement is that a rod section can also be placed above the measuring device. This can aid in determining compressive loads caused by friction when traveling downhole. This compressive loading is generally only present when traveling down the wellbore. As the lower rod section encounters a frictional resistance, an upward force is created and may even cause the rods to stack out. The upward force caused by that friction is then registered either as a reduction in load, or a compressive load if the friction is significant enough to restrict the fall of the assembly. This is because the weight of the rods above is partially applied to the load-cell, as opposed to being strictly held in tension. Tension, reduction in tension, or compression can be measured on the load-cell incorporated in the downhole tool and correlated to a frictional resistance at a specific depth.

Position of the traveling downhole tool is necessary and critical. This can be obtained either directly on the tool itself by way of a physical measurement such as a rotary encoder traveling along the tubing or casing wall, or by a magnetic sensor to count couplings present in the wellbore. If an accelerometer is also placed in the traveling downhole tool, this can also be used to determine position. In fact, the accelerometer in the tool can also be used to determine inclination angle of the tool, which is a component of the overall deviation survey. Deviation surveys consist of both a compass heading and an inclination angle. Because the device is in a steel tube, the magnetic compass heading is difficult to sufficiently determine without the use of a high precision gyroscope or complex in-place calibration procedures. The general inclination angle of the tool is sensed by gravity or by the inertia of the tool and is unaffected by external equipment in the wellbore. This inclination measurement can help supplement existing deviation surveys and is a convenient byproduct of the traveling downhole load and position data logger.

The position of the traveling tool can also be obtained by synchronous readings at surface. The means for obtaining position are a primary distinction between the surface and downhole tool configurations, but the overall methodology for determining friction is the same. Under dynamic conditions, wave equation methods can be applied to the cable to determine more precisely where the tool is at the far end of the cable/wireline. The synchronized surface measurements can be combined with acceleration or positional data gathered on the moving tool (sensing device) to more precisely determine the absolute position of the tool and load readings during its trip through the wellbore. Another means for obtaining downhole position on the tool is to incorporate one or more magnetometers to sense tubing or casing collars. This can help correlate absolute position within the wellbore but can also be used to determine a velocity of the tool as it passes a collar. The values of velocity and position can then be utilized to (re)calibrate an accelerometer through the double integration of acceleration to velocity to position discussed below.

Apparatus to obtain surface data: Work-over service rigs are not generally instrumented with the necessary acquisition and logging equipment necessary to perform these calculations. This is because the work-over rig is a mechanical tool, and not generally regarded as a high-tech instrument. Additionally, the rig is a particularly harsh environment and achieving the high-frequency and high-resolution data acquisition requirements is challenging. A device does not currently exist that can sufficiently measure the detailed load and position needed to perform this friction analysis during a work-over.

There are several sensing components that can be integrated onto a work-over rig to measure load or position. A rotary encoder can be used to measure cable length, which can be used to determine position of the rods. The cable itself introduces a varying component of stretch. This is not an insurmountable problem, and so directly measuring position somewhere along the rig's cable system is one possible approach. External string potentiometers, or laser ranging systems could be used to determine position, but are likely to be damaged during "normal" rig activity. For load measurements, a cable deflection style load-cell can be integrated into the lifting system. In fact, this type of load measurement is present on many rigs. Unfortunately, measuring load on the cables this way is not always possible due to changing rig cable configurations. Cable deflection is also less accurate of a measure. A load measurement could be taken on the rig structure, or even torque on the draw-works drum, but these are generally not sensitive enough for the purposes of friction measurement. The apparatus to measure and log this data could utilize load and position measurements from any source, including (but not limited to) the ones listed above.

The preferred embodiment presented here utilizes an accelerometer and load-cell placed in line with the rod hook. This is determined to be the most convenient location from an integration standpoint, and since it is precisely at the point of interest it is also the most straightforward from a calculation and analysis perspective. Accelerometers present a unique challenge in that calculating position involves a double integration from acceleration to velocity, and then again to position. Any errors in this calculation compound over time. A critical observation in the work-over process is that the rod section being pulled is known and consistent for much of the operation. Furthermore, the load transition always occurs at the same place on the rig floor, as the remaining rods are hung from the wellhead. This load transition allows the accelerometer data to be calibrated to position at two distinct locations; top and bottom of stroke, at a fixed and known length apart. This limits the errors in the acceleration measurements. Additionally, but not strictly required, a barometric pressure sensor can be utilized to further calibrate the acceleration-to-position calculations during the vertical travel, compared to just at the top and bottom of stroke where the load transfer occurs. Atmospheric pressure data can help identify partial strokes and positively determine direction of travel and overall position of the sensing device and to supplement the accelerometer derived position.

During the work-over process, a manual count of equipment to be installed in the wellbore is maintained. When installing rods, this is less critical because the number of rods is limited by the length of tubing. When installing tubing, however, the exact placement of the pump is achieved by installing a prescribed number of tubing joints. This is handled through a manual tally count of tubing joints installed. Too many or too few tubing joints can cause the pump to be located incorrectly. Because this is a manual counting process, it is prone to errors. A byproduct of logging load and position during the work-over process is itself a log of the equipment installed. The total number of rods or tubing joints can be derived from the logged data and can assist the rig crew in their manual equipment count. This count information can be post processed, or displayed in real-time, given adequate onboard processing capabilities.

In addition to the count of equipment installed or removed, which can be obtained from the recorded log of load and position data, a profile of the handling of equipment can be derived. For example, when pulling rods, recorded loads can indicate if an abnormal condition was encountered that may have overloaded, and thus compromised the integrity of, the rods being pulled. Likewise running the rods too fast may be an indication of a careless or improperly managed rig crew. These measurements can help indicate potential sources of failure by identifying mishandled equipment.

In a rod pumped well, it is desirable to better understand the behavior of friction to both; improve the application of downhole equipment, and better understand the operational dynamics for analyzing existing pumping wells. The invention presented here aims to measure downhole friction and close the loop on applying that measured friction to improve design and analysis of rod pumped wells.

BRIEF DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
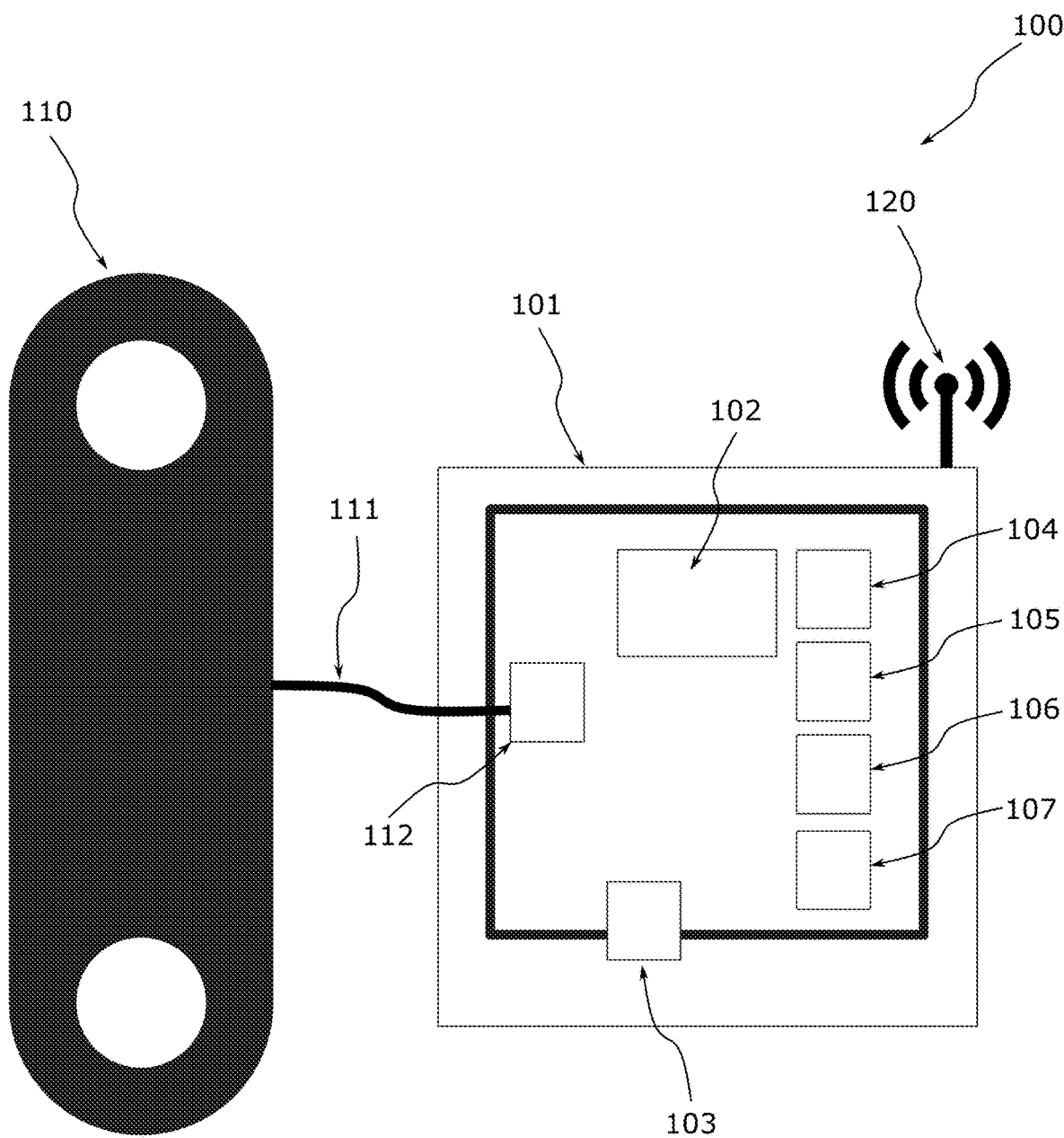
FIG. 1 illustrates a detailed view of the sensing device, and its various components, as placed inline with the rod hook. This is otherwise referred to as the surface sensing device.

The service, or work-over, rig refers to any piece of equipment tasked with installing or removing equipment in the wellbore. The service rig is typically a purpose-built mobile piece of equipment for the specific task of installing or removing rods and tubing in an oil or gas well. Other equipment may perform similar operations. These include, but are not limited to, drilling rigs, wireline trucks, or even general-purpose cranes. Although this document specifically discusses the act of well servicing (installing and removing equipment from an already drilled and completed well), substantial portions of this may also apply to determining friction while drilling a well, or during other phases of the well operation.

The rod-string refers to the length of rods present in the wellbore, used to actuate the downhole pump. These could be traditional rods or continuous rods. They could be steel, fiberglass, or other material. The rods can be operated in a reciprocating motion for a rod pump, or in a rotating motion for a progressing cavity pump. Traditional rods are typically installed or removed 1, 2, or 3 rods at a time by a work-over service rig. It should also be understood that, while this disclosure particularly discusses traditional sucker rods, the same method can be applied to tubular equipment deployed within the wellbore. Rods and tubular equipment may be used interchangeably in this discussion, as they largely behave the same in terms of stretch and dynamics related to friction.

The wave equation is a general mathematical method for determining conditions at the far end of an elastic material (i.e. steel or fiberglass rods) under dynamic conditions. Much has been published on this topic, initially proposed in U.S. Pat. No. 3,343,409.

The Gibbs Conjecture refers to how mechanical friction is handled in the wave equation, or more precisely, how it is not handled. Specifically, it shows that unaccounted mechanical friction manifests in an incorrect calculation of load and position at the far end of the rod string. This results in a distorted dyno card.

A dyno card is the plot of load and position over the cycle of a pump stroke. This can be plotted at surface or at the pump. The "dynamometer card", or plot is a well-known representation to those skilled in the art. An example of such a plot can be seen in 941/942.

A load-cell refers to a device intended to measure tensile and/or compressive loads. A load-cell can take many forms such as a tension-link discussed herein, but also simple strain gauges and several other mechanical configurations. It is understood that the electronic signal from a load-cell is processed into a reading equivalent to a force, typically expressed as pounds.

Friction can occur in multiple forms. Viscous fluid friction is relatively well understood in the industry as it generally acts uniformly over the rods and is velocity dependent. This type of friction is includes in all current implementations of the wave equation used in the industry.

Mechanical friction is the focus of this work and acts at specific points, relative to applied normal force. It also varies from static to dynamic conditions. As the rod-string stretches, the timing and magnitude of the static-to-dynamic friction transitions becomes increasingly complex. It is therefore highly desirable to thoroughly understand, by way of direct measurements, the behavior of friction in a given wellbore.

Description of Selected Specific Embodiments

FIG. 1 illustrates the sensing device as implemented for a work-over service rig. The load-cell, 110 is illustrated as a tension link, which is to be placed in-line with the load being lifted. Any suitable load-cell, such as one with threaded pin ends, could be utilized. A processor 102 is collocated in the sensing device 100 to record readings obtained by the various sensors. Position measurements are obtained through a combination of sensors such as barometric pressure sensor 104, accelerometer 105, gyroscope 106, magnetometer 107, and an analog to digital conversion 112, to digitize the raw load-cell signal. Provided adequate processing power, the position of the sensing device 100 can be updated in real-time. Alternatively, the raw readings are logged to digital storage 103 to be retrieved and post-processed.

Because the sensing device is in motion and in a hazardous environment, it may be desirable to provide a wireless user interface to verify system integrity. A transceiver and antenna for data transfer may also be provided, 120. Real-time loading, position, equipment installed/removed counts, peak and average travel velocities, etc. can be provided to the user via an electronic receiving and display device such as a phone or computer. In some configurations it might be desirable to synchronize external measurements, such as a rotary encoder on the draw-works drum or cable. The transceiver may also be used for synchronization with these external sensors.

Figure 2:
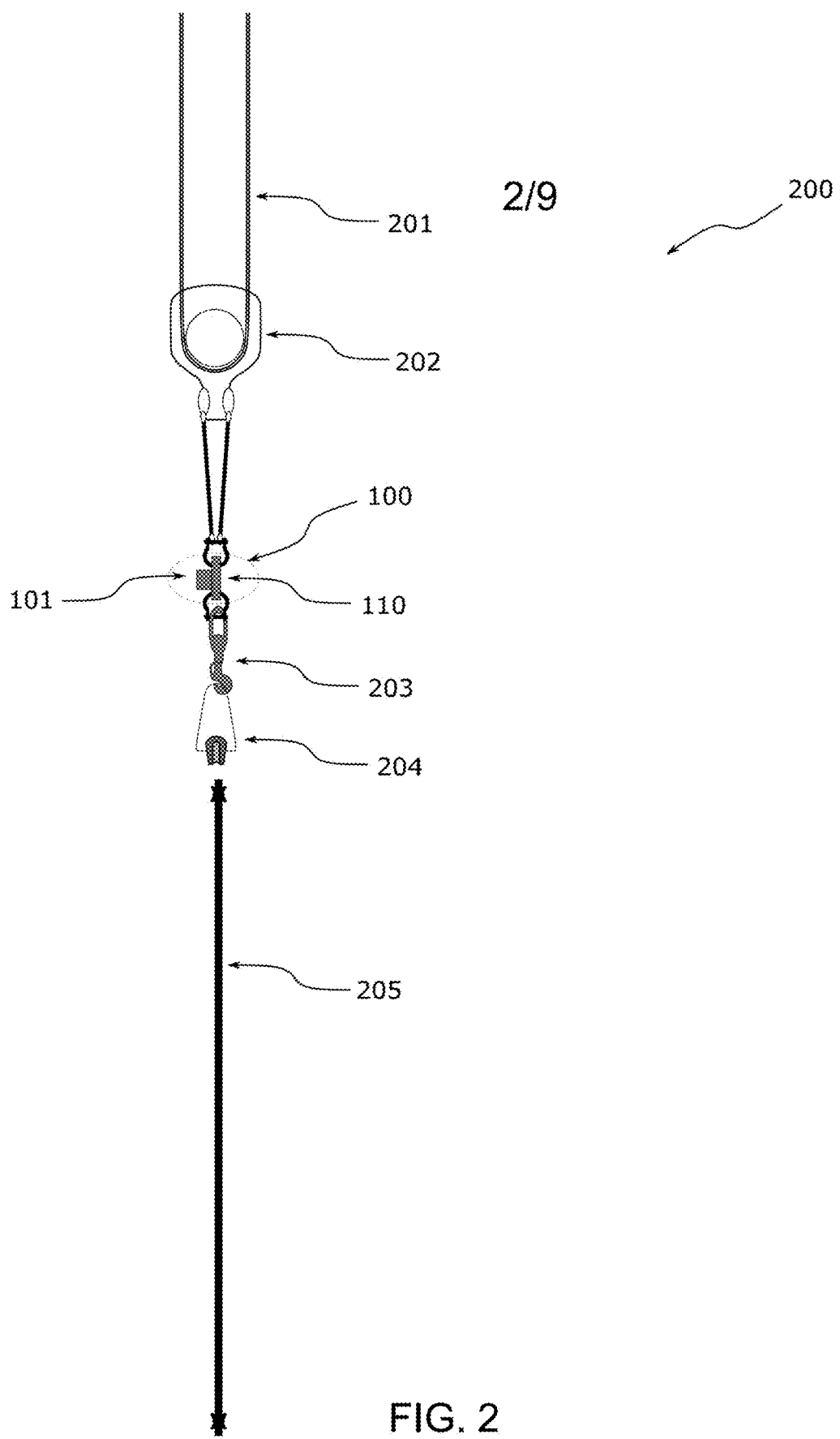
FIG. 2 shows the placement of the surface sensing device in a typical configuration on the lifting assembly of a typical work-over rig.

FIG. 2 illustrates the placement of the sensing device 100 in a typical configuration on the lifting assembly, 200, of a work-over rig. Cables, 201, are attached to a series of pulleys referred to as "blocks" 202. Through a series of mechanical connection, the blocks are connected to the rod-hook, 203. In a normal work-over configuration, the rod hook 203 is typically shackled directly to the lifting assembly. When handling the rods, the rod-hook 203 is used in conjunction with a pair of rod elevators 204 to bear the weight of the rods 205.

In this configuration, the sensing device 100 is placed above the rod-hook 203 with an additional shackle. This allows the sensing device 100 to directly measure the tensile loads via the load-cell 110. Alternatively, the load sensing component could be incorporated into the shackle or rod-hook itself. Placing the sensing device in-line with the lifted load ensures that loading is directly obtainable and not subject to undesirable external forces. Position measurements can also be measured at this point as it is precisely located at the equipment to be measured, both of which are advantageous in the processing of the data.

Figure 3:
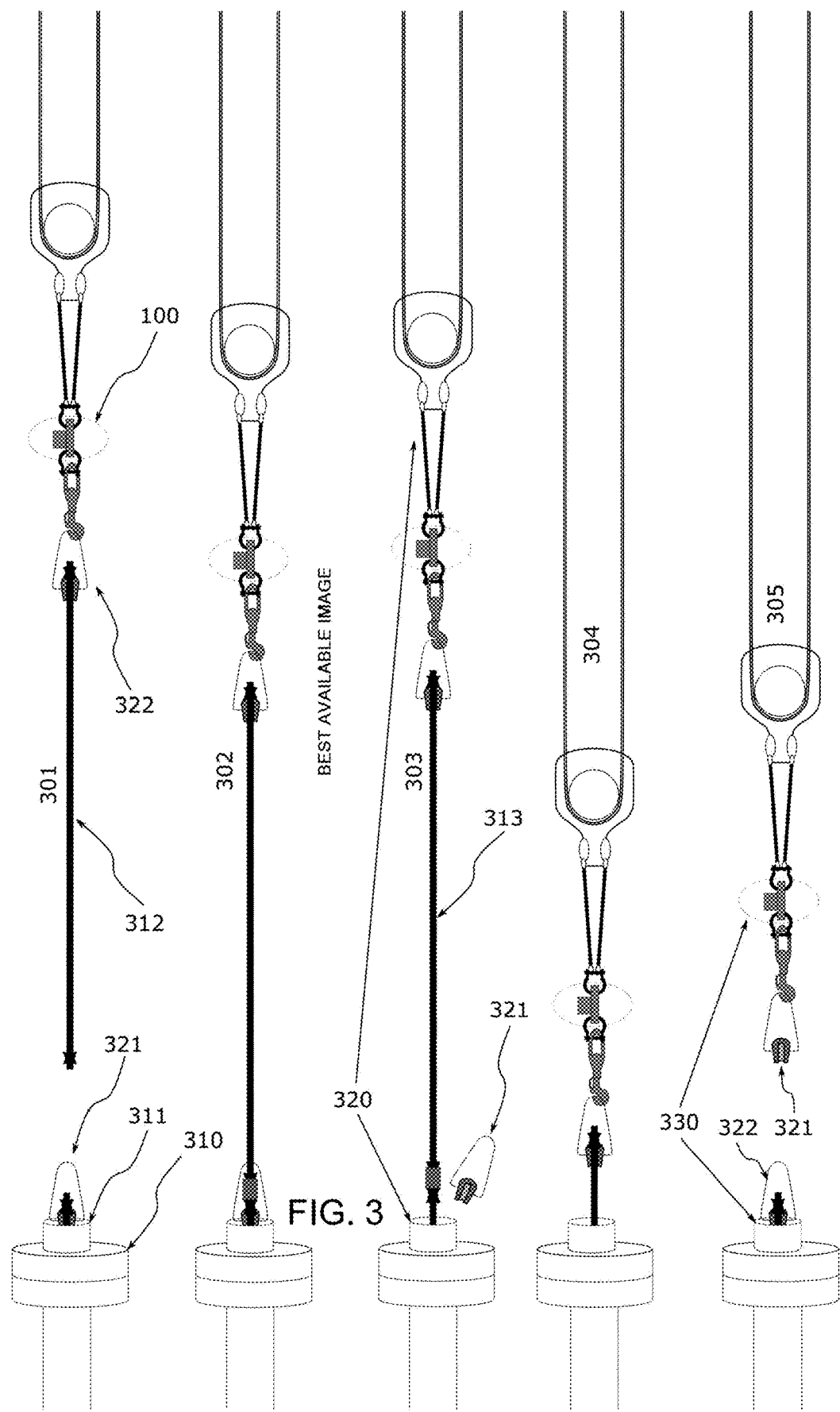
FIG. 3 provides a step-by-step process in which a section of rods are installed and the entire rod-string is lowered into the well. A similar, but reversed, process is used when removing rods from the well.

FIG. 3 illustrates a multi-step process of installing rods into the wellbore. As illustrated in FIG. 2, the sensing device 100 is placed inline as to observe the applied loads on, and position of, the rod hook. The wellhead is illustrated in 310 and the "rod table" is illustrated in 311. The initial process step illustrated, 301, shows a section of rods already hanging in the wellbore from the rod table, on the rod elevator 321. A "new" section of rods 312 is also initially illustrated as hanging from the rod hook on a second rod elevator 322. For brevity, the entire process is not illustrated, only the pertinent steps to identify loads and positions are shown in steps 301-305.

In the initial step 301, the sensing device sees the weight of a small section of rods (possibly multiple individual rods, typically no more than 75 feet). The new section of rods is lifted and positioned over the wellhead. The new rod section is then lowered and attached to the larger section of rods hanging from the wellhead 310-311. In step 302, the sensing device 100 briefly sees a reduction in loads as the rods are lowered and threaded onto the rods in the wellbore. In 303, the fully attached length of rods 313 is slightly lifted so the lower rod elevator 321 can be removed. It is important to note this load transfer occurs when the sensing device is high. 320 shows the load transfer happens at the wellhead but is seen by the sensing device a known distance above the wellhead.

Step 304 then lowers the rods into the wellbore, during which, the load and position are gathered throughout the length of the "stroke". This process of lowering the rods 313 (or alternatively lifting the rods) exposes them to downhole friction which is recorded by the sensing device. Of note, friction can only act along the length of rods currently in the wellbore. The process of repeatedly installing (or removing) rods changes the length of rods in the wellbore, which allows the sensing device to "see" friction acting at different depths by way of the friction-exposed rod sections. This is a key step in the friction measurement to be performed.

The process cycle concludes in 305 where the rods come to rest on the wellhead via the rod elevator 322 used to lift the section of rods. The lower rod elevator 321 that was removed in step 303 is placed on the rod hook so that the next section of rods may be lifted, and the process repeated. Of note here is the load transfer illustrated by 330 again occurs by hanging the rods on the wellhead, but this time the sensing device is low. The load transfers at 320 and 330 allow the accelerometer to be calibrated when the sensing device is at a known distance apart (namely the length of rods just installed or removed). Increased load at the top and removed at the bottom indicates equipment was installed in the wellbore. Load increase at the bottom and removed at the top indicates equipment was removed from the wellbore.

Figure 4:
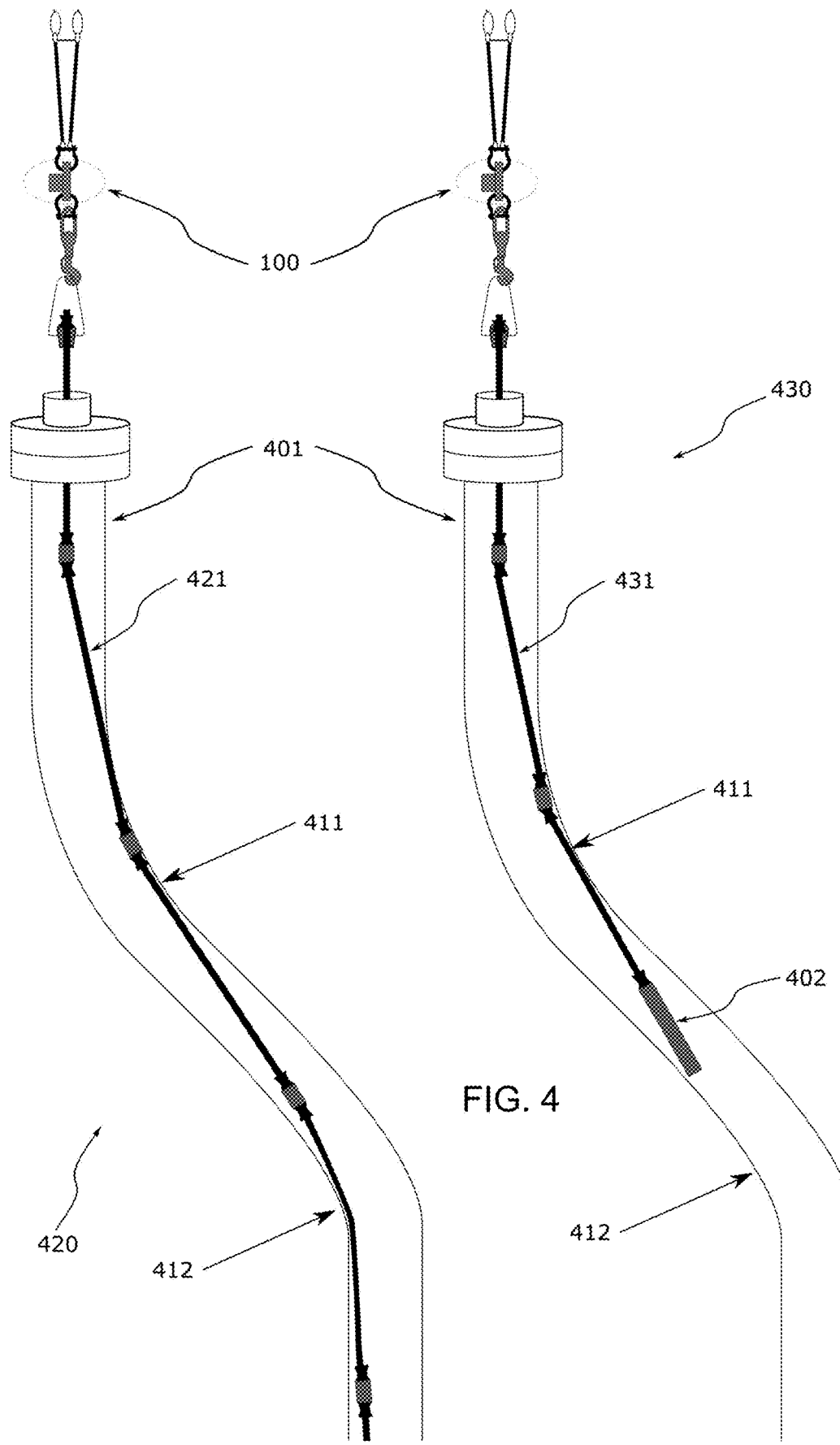
FIG. 4 shows downhole frictional contact points along the rods. This also illustrates how, by lifting the entire rod-string, the lower section of rods is no longer exposed to a friction point in the wellbore.

FIG. 4 illustrates a downhole view of the process in FIG. 3. In this illustration the rods are being removed from the wellbore, which is converse to the process illustrated in FIG. 3. 401 shows a single tube for simplicity. In an actual well, the rods are installed in tubing which is installed in casing. The purpose of this figure is to illustrate rod contact and thus friction in a deviated wellbore. Specifically, the contact points 411 and 412 impart a normal force on the rods under tension. 420 shows the rods, 421, extending passed the friction points 411 and 412 and loads observed by the sensing device 100 will include the cumulative friction-induced loads of both 411 and 412. Dynamic forces will also be observed, but these can be removed using wave equation methods.

Many rods have been removed in the right illustration 430 and the remaining rods 431 are no longer subject to the friction at point 412. The sensing device 100 now only sees the friction caused by 411. 402 illustrates the end of the rod-string which typically would be a pump or a plunger. Of note in this illustration is the comparative observations between the left 420 and right 430 illustrations provide a map of friction vs. depth for two distinct ranges. This is repeated for many depths to provide a continuous mapping through the wellbore.

Figure 5:
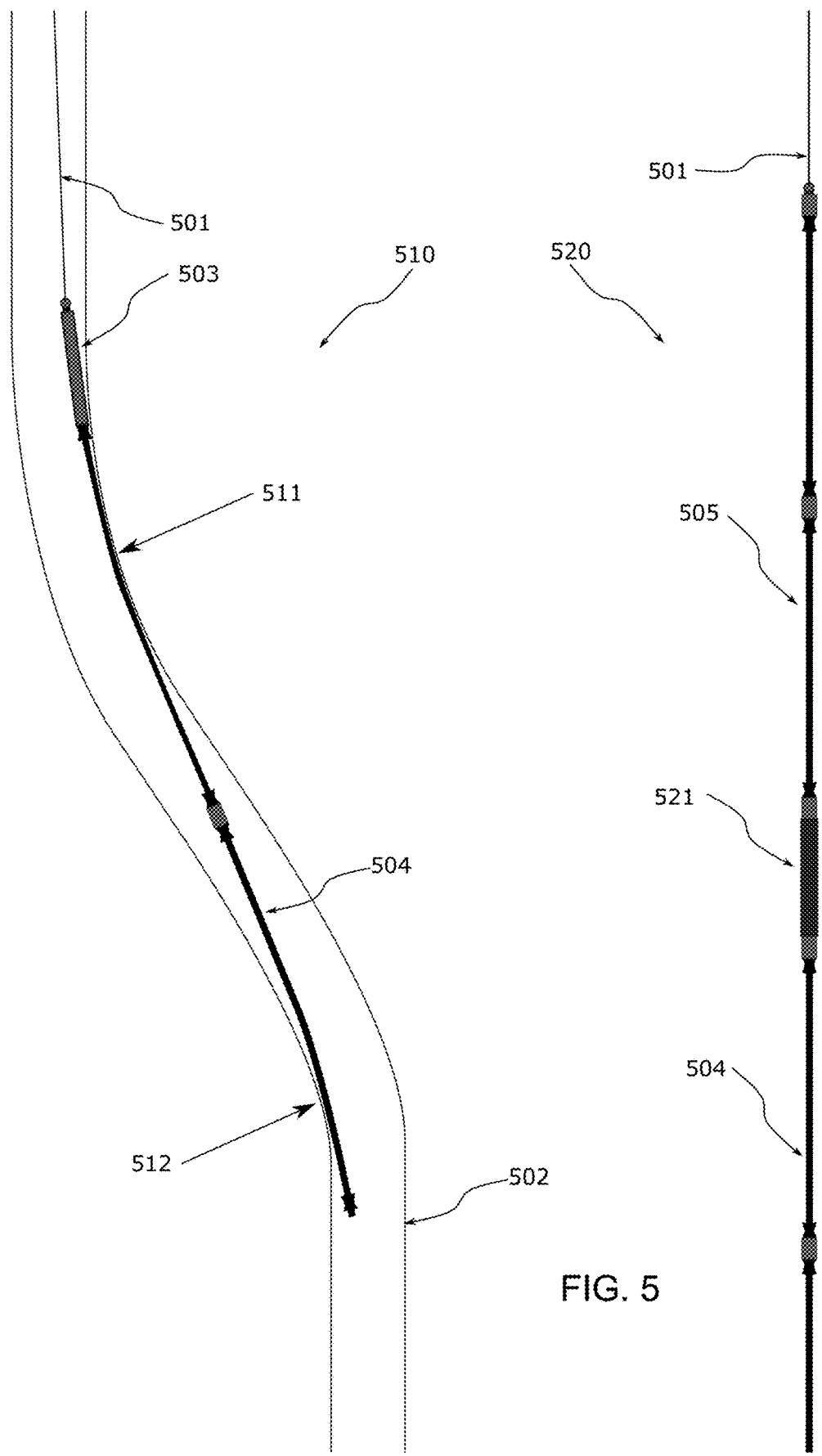
FIG. 5 shows a modified embodiment of the sensing device from FIG. 1. This embodiment is intended to travel with a section of rods through the wellbore and is otherwise referred to as the downhole sensing device.

FIG. 5 presents an alternative implementation of the sensing device, which is similar to that of FIG. 1. In this configuration, the components from 100, particularly the load-cell and electronics are packaged in a slim tool 503 or 521, which can pass through the wellbore 502, or specifically through the tubing within the wellbore. The housing of the sensing device is tailored to the environment in which it will operate, but the underlying method and measurement data for determining friction is similar. FIG. 5 also illustrates the downhole sensing device traveling through a deviated wellbore path. In this configuration, the tool is lowered via a cable or wireline, 501. On the work-over rig this cable is typically referred to as a "sand-line" but could be any mechanical attachment such as coiled rods or tubing, drill pipe, standard cable, etc.

A section of weighted rods 504 and/or 505 are attached to the downhole sensing device. Friction encountered along the weighted rod section, specifically illustrated at points 511 and 512, will impart a varying frictional resistive load on the tool. In 510, the tool will substantially register tensile frictional forces when being pulled up. Frictional forces encountered when traveling downhole may also result in a reduction in tensile load. The configuration in 520 adds a section of weight-bars to the top of the sensing device, which may help identify significant frictional restrictions as the sensing device can be "pushed" downhole, in addition to simply falling under its own weight. In this configuration, the tool could measure both tensile and compressive forces.

The length and weight of rod sections (504 and/or 505) will affect the friction measurements. The case of the surface tool configuration illustrated in FIGS. 1 through 4 is a general case, with a very long section of rods. Friction at varying depths using the surface sensing device is accomplished by keeping the surface tool in one general locating and varying the length of attached rods. In the case of the downhole sensing device (503 or 521), the friction at varying depths is determined by keeping the length of rods constant but varying the position of the assembly through the wellbore.

In the case of surface measurement, the elasticity of the rods is significant due to the length and so dynamics need to be accounted. Elimination of these dynamic conditions is handled through the wave equation methods discussed above. In the case of the downhole sensing device embodiment, the length of rods will generally be relatively short and can be considered rigid. On the other hand, because the cable 501 is long and elastic, motion dynamics of the entire assembly need to be accounted for. Fortunately, the nature of the data being collected, namely load and position measurements at regular and high frequency intervals provides an understanding of the motion of the tool through the wellbore. The dynamic loads can then be corrected for accelerations and orientation. Any remaining unaccounted forces are then attributable to friction acting on the rod sections 504 and/or 505.

Position measurement in the downhole configuration is challenging. The sensed load and position measurements need to be correlated in both time and space. One approach would be to use a wheel running on the inside of the tubing. This is quite challenging in a wellbore as the tool undergoes significant abuse as it travels through the wellbore and would likely render a mechanical position measurement ineffective. Another approach would be to record position at surface and synchronize the measured downhole loads in time. This would result in two distinct and separate components in which readings would need to be correlated after the tool is returned to surface. Additionally, the measured distance on the wireline does not always correlate to the position of the downhole tool as the wireline stretches and contracts with dynamic forces. The accelerometer 105 can help determine dynamic motion of the tool and could be further used to augment surface position measurements. In fact, the nature of the accelerations experienced in the downhole sensing device attached to a stretchy cable can indicate sticking and slipping, indicative of friction acting on the assembly. Pressure and temperature measurements could also be provided in the downhole configuration.

Alternatively, one or more magnetometers 107 could be used to count tubing couplings as the tool travels through the wellbore. One or more magnetometers 107 could also be utilized to determine a velocity of the tool as it passes metal couplings. This would manifest as a small distortion in the magnetic field seen by the magnetometer. With these fixed reference positions and corresponding velocities, the accelerometer could be recalibrated frequently to provide more accurate position measurements when traveling through the wellbore. This can be implemented with or without synchronized surface position measurements. Furthermore, the use of magnetometers provides a solid-state measurement and would be less likely to fail from mechanical abuse.

It should also be noted that both the surface sensing device and downhole sensing device could be utilized in the same well and their respective data-sets could be combined to further increase the accuracy of the downhole friction map.

Figure 6:
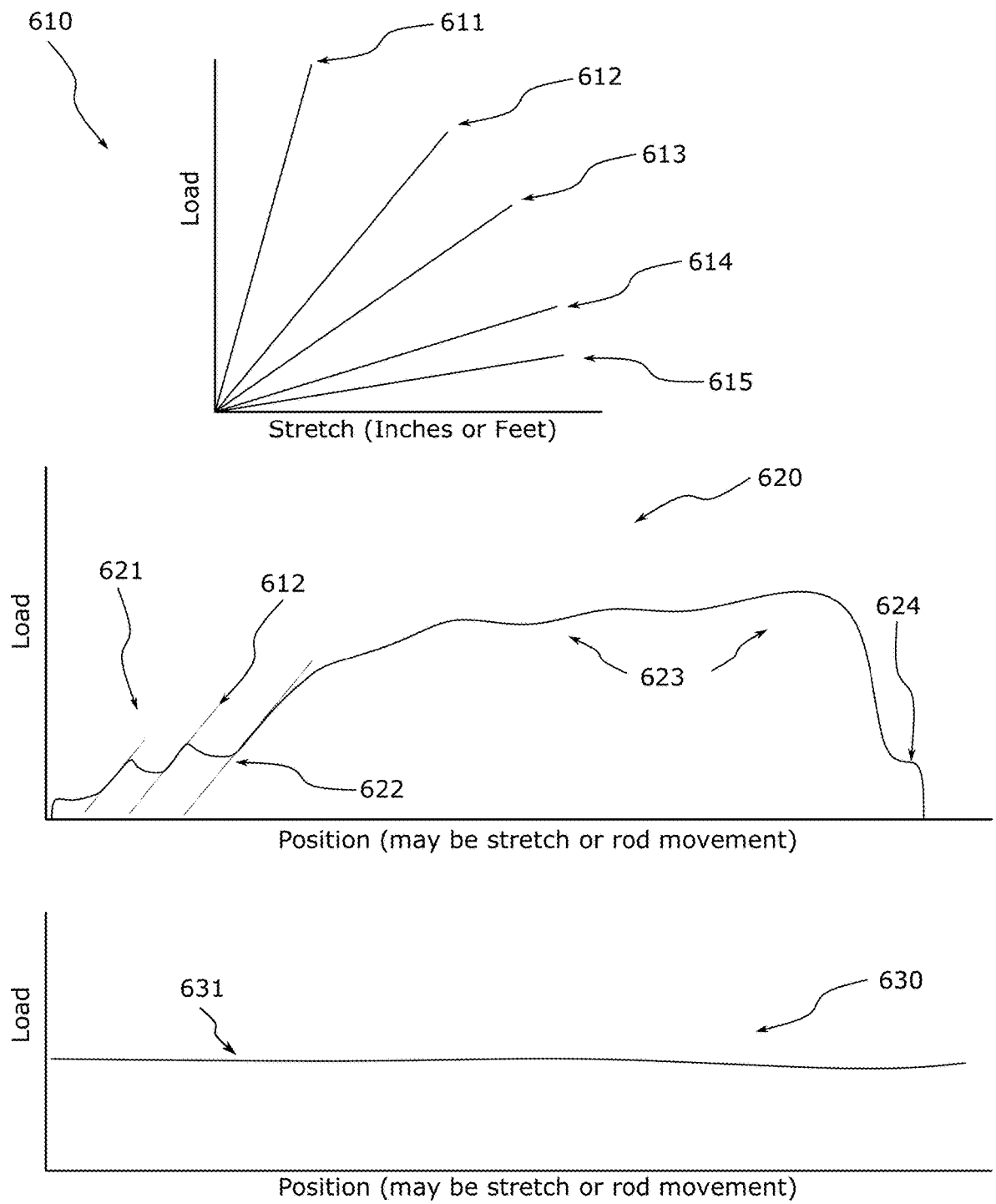
FIG. 6 shows various plots associated with a prescribed well procedure referred to as a "slow pull". This procedure is optional.

FIG. 6 illustrates an alternative measurement process that attempts to minimize dynamic forces. The main approach is to gather load and position data during normal dynamic work-over procedures, which requires the dynamic forces to be removed mathematically. The plots illustrated in FIG. 6 prescribes the rig to slowly pull on the rods in order to observe static friction. This is not a typical rig procedure but is simple and can yield useful additional measurement data.

610 shows rod stretch for different lengths of rods. This is a visual illustration of Hooke's law (F=−kx) where an applied load induces an elongation by a constant spring factor. More applied load results in more stretch and is illustrated as a straight line as it is a direct relation. The spring constant (k) is a factor of the overall un-stretched length and material. Slope lines are shown for different overall lengths of rod in 611-615. Shorter or more rigid rods are shown with a steeper slope. For example (assuming identical rod materials) 611 would indicate a shorter section of rods compared to 615 for the same applied load. Utilizing these slope lines, one can identify an applied load and positional change to identify a potential spring constant, and thus overall rod length between the point of measure and the point where the downhole rod section is held due to friction. Once enough force is applied to the downhole static frictional resistance, the frictional force transfers from static to dynamic. The result is a release of load as the rods being to move upwards.

620 illustrates a typical slow pull plot of load vs position. 621 shows a stick and slip behavior as the rods are held by a downhole frictional resistance. The rods slip when the applied load overcomes this frictional resistance. The slope of this pattern can be seen in 622 and can be referenced with the known slopes shown in 610 to determine a depth. In this case, the slope of the line matches that of 612, and so the length of rods corresponding to that spring constant can be identified. The remainder of 620 shows the rods in a dynamic friction state. For comparison, 630 is shown for the expected behavior of slow-pulled rods in the absence of friction. For an analogy, this would be like standing on a bathroom scale in a constant velocity elevator.

Lynn Roland observed this phenomenon in pumping wells, but for it to manifest, the static friction needs to be substantial or the pumping speed must be extremely slow. It is further complicated in a running well because a typical pumping unit is a crankarm driven system and is subject to accelerations during the stroke. The work-over rig affords an opportunity to control and minimize the dynamics to provide an accurate and consistent measure of static downhole friction magnitude and location.

Figure 7:
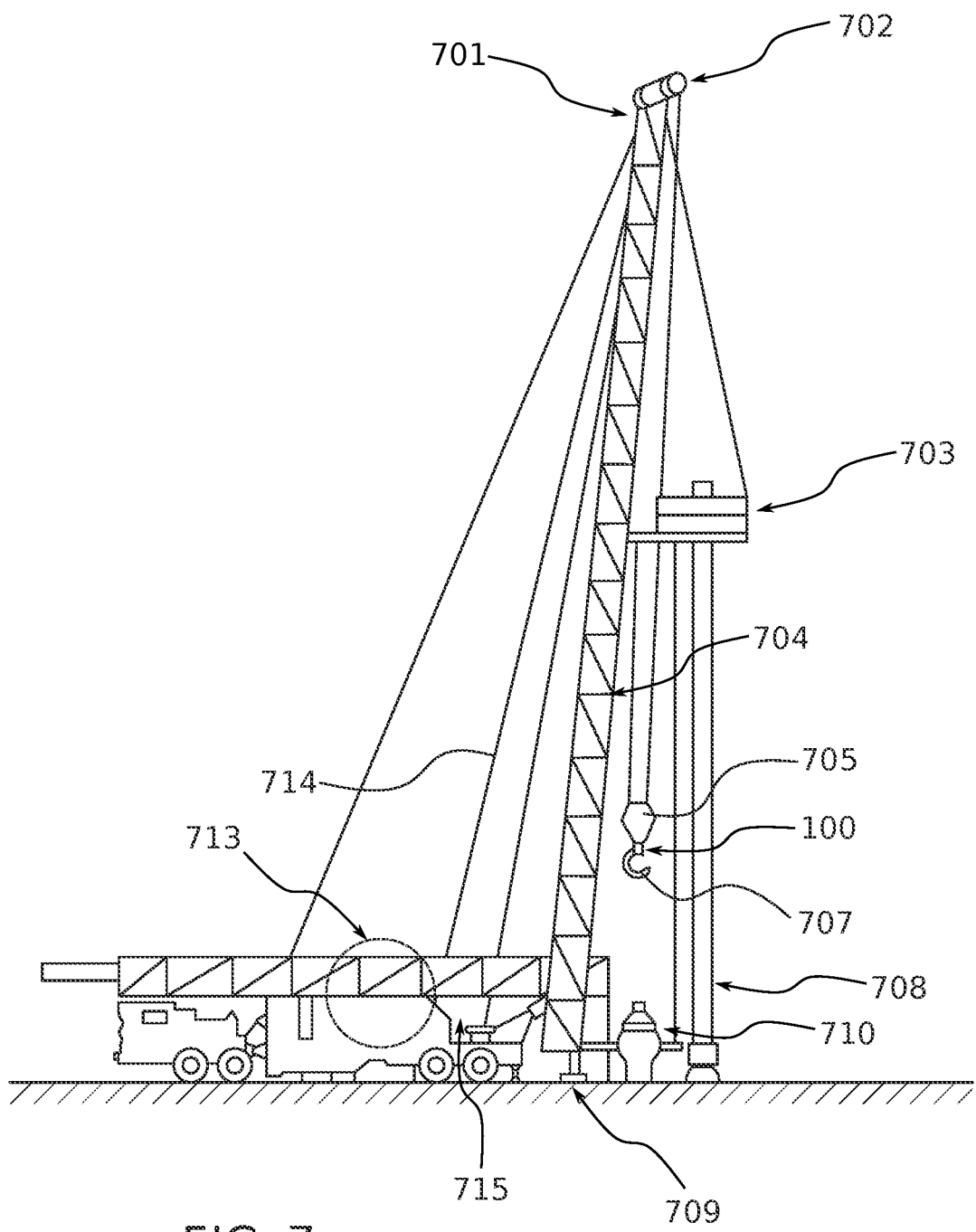
FIG. 7 shows various sensing locations on the work-over service rig. Load and position can be gathered from a multitude of locations. The preferred location, as illustrated in FIG. 2 is on the rod hook.

FIG. 7 outlines some of the alternative sensing locations. This illustration is provided to demonstrate the measurements can be implemented through multiple distinct and separate sensors. The self-contained sensing device illustrated in 100 or 503/521 is one of many possible measurement approaches. The preferred sensing location is as close to the top of the rods as possible. This is ideal from a loading perspective, but the process of determining position through acceleration data may be problematic. Fortunately, the load transfers discussed in FIG. 3 can help to calibrate the acceleration data to precise spatial points, which can help to limit accumulated errors. Alternatively, position can be obtained through the cable actuated lifting system, 714. This can take the form of measuring cable distance traveled, revolutions (or partial revolutions) of the various pulleys, 702 and 705, or cable spool 713 (draw-works). A measurement wheel can be placed along the cable to precisely measure distance traveled. Load can alternatively be obtained by a cable deflection along 714, structural loading on the rig 709, torque applied to the drum 713 (draw-works) actuating the cables, etc.

Figure 8:
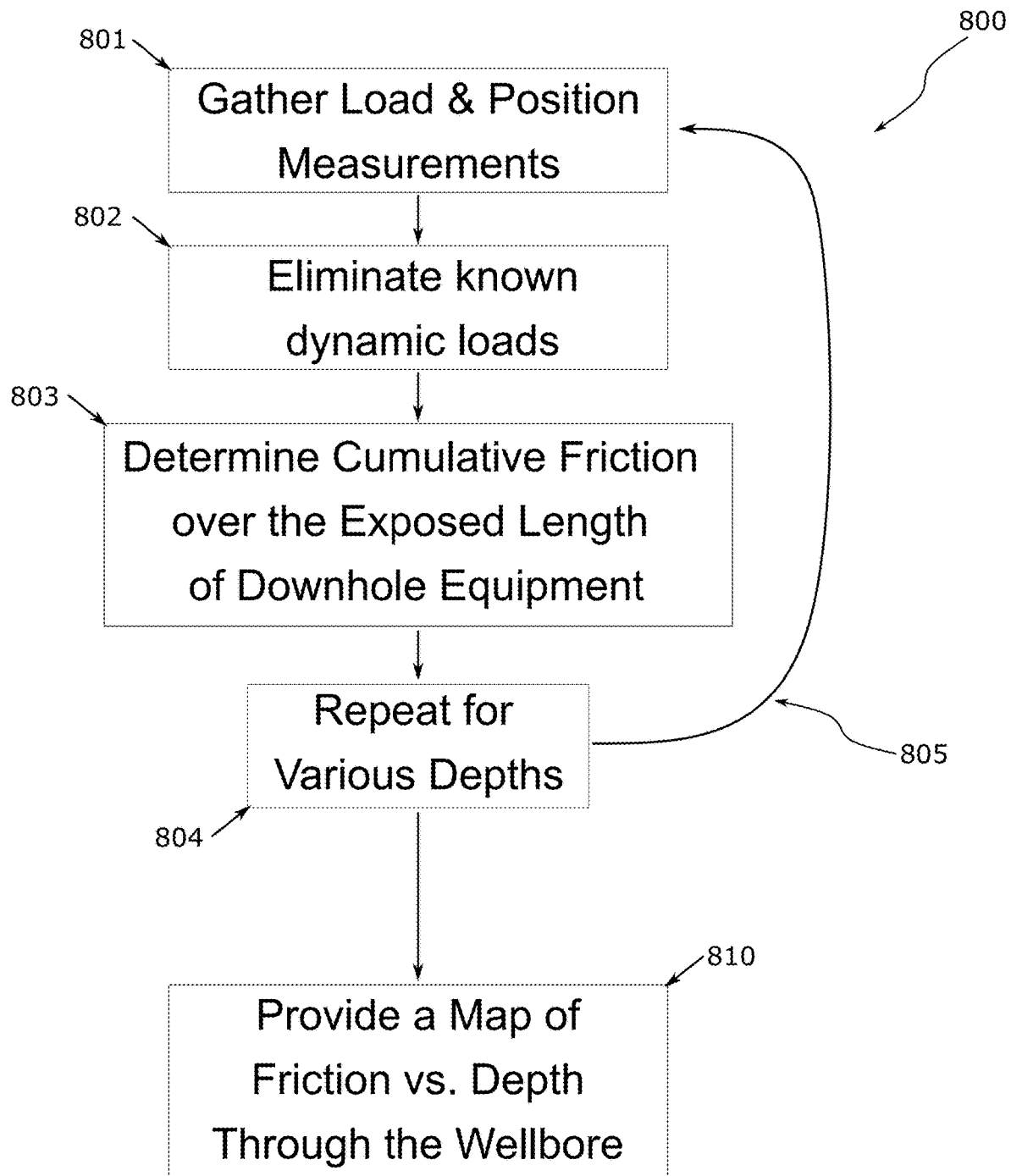
FIG. 8 provides a flow chart showing steps for performing the method of the present invention, in one embodiment.

FIG. 8 is a flow chart of the general method to determine and map downhole friction. Step 801 is similar to analyzing an operational well using existing wave equation methods. Because the well servicing operation is occurring without downhole pump action, 802 utilizes the wave equation to correct for the dynamic loading caused by accelerations and rod stretch. The remaining forces in 803 are an indication of the cumulative friction acting on the rods in the wellbore, as per the Gibbs Conjecture. Again, this states that unaccounted friction shows up in the resulting calculations. This is used to our advantage here. 804 repeats this for each section of rods (or other equipment) installed or removed. Once data is gathered and processed for each section of the wellbore, the process concludes and a map of the observed friction for each exposed depth is presented in 810. 810 represents the progression of friction measurements from each of the equipment installation or removal cycles, and thus depth, repeated by arrow 805.

Figure 9:
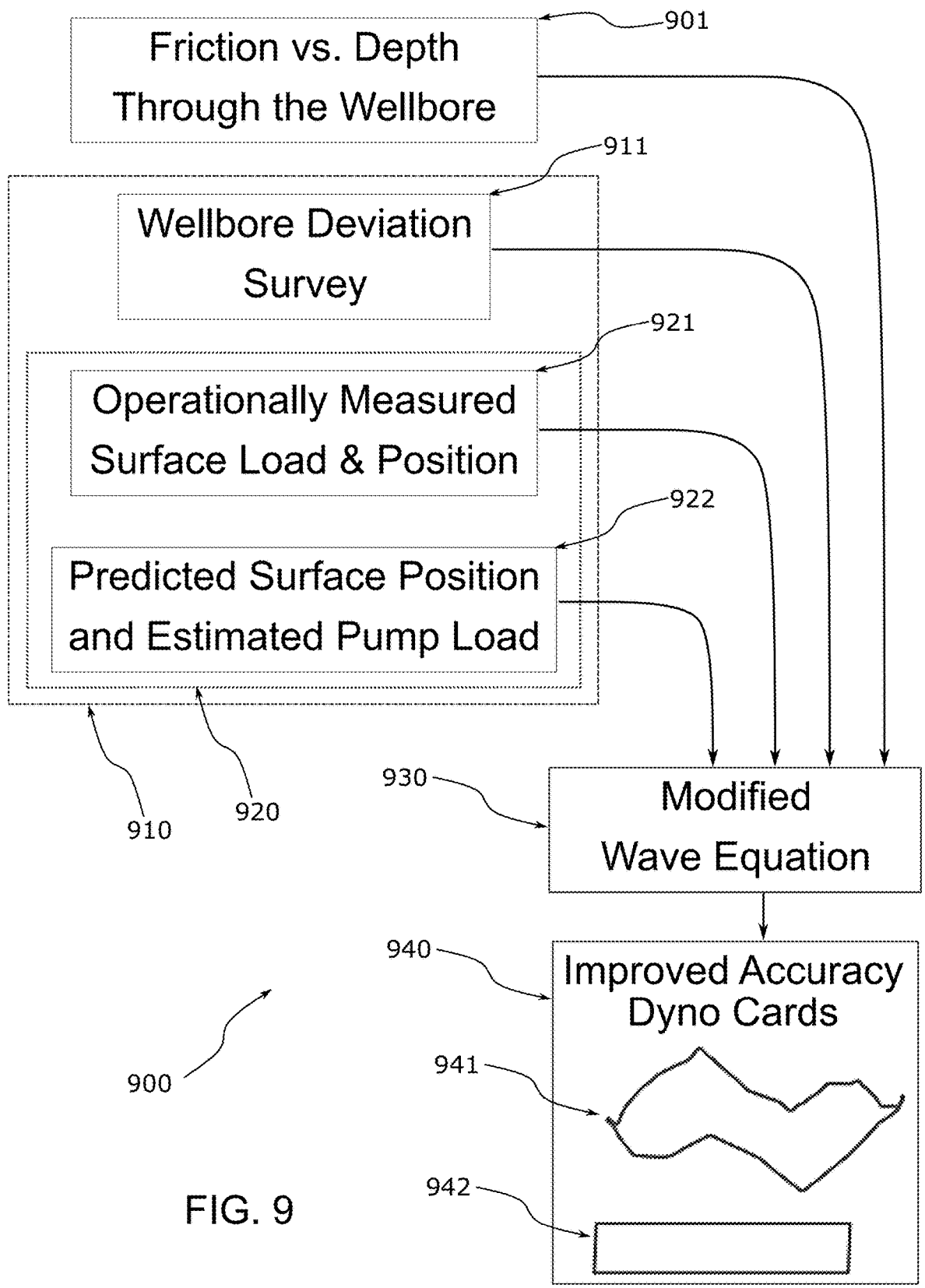
FIG. 9 provides a flow chart for applying the measured friction map to the design and analysis of a pumping well. This effectively closes the loop on the so-called Gibbs Conjecture in that a more precise friction model, by way of this method and apparatus, results in a more accurate calculation of conditions.

FIG. 9 is a flow chart of the general method of applying the downhole friction map to the design and diagnostic methods of pumping wells. The friction map is ideally gathered through the method illustrated by FIG. 8, and by using the sensing device discussed herein, but friction could presumably be obtained through other, yet undetermined means. One such approach is disclosed in application Ser. No. 15/929,928 "Dynamic Pumpjack Load Verification".

The current industry approach is contained in 910 where a wellbore survey is combined with either measured data 921, or predicted data 922, into the wave equation to produce calculated dyno cards 941/942. 920 shows the two fundamental approaches to start the calculation. In 921, an operational well generates load and position data at surface and the wave equation calculates the load and position at a distance, namely the pump. This is referred to as the diagnostic or analytic approach. Briefly, given the surface measured plot in 941, the downhole plot in 942 is calculated. 922 shows the predictive approach and is used when designing a pumping system. In this, the surface motion is predicted from equipment geometries and the pump loading is predicted from pump size, depth, and fluid properties. The wave equation then calculates the remaining conditions of surface load and pump position ahead in time. In other words, one component of plot 941 and one component of plot 942 is given, and the other components are calculated to complete the plots.

The addition of a measured friction map through the wellbore, 901, can be incorporated into a modified wave equation implementation, 930. The result is improved accuracy dyno cards 940. Of importance, utilizing the Gibbs Conjecture and the same friction model, the resulting dyno cards generated by both the diagnostic source data 921, and the predictive source data 922, should produce identical dyno card plots. This serves as a check on the accuracy of the friction model 901 for the given well incorporated into modified wave equation 930. A further improvement to this method would be to utilize measured surface position for the predictive approach. FIG. 9 primarily discusses operational wells but can also be incorporated into the method of determining friction using the work-over service rig. The diagnostic approach is primarily used to determine a calculated load variation perceived at the bottom of the rods. This is assumed to be cumulative friction acting over the entire rod length. Conversely, the "predicted" surface loads could be compared against actual surface loads to get another perspective on downhole friction acting on the rods (or tubing) moving through the wellbore.

I claim:

1. An apparatus for measuring downhole friction in a wellbore during a workover or wireline procedure, comprising:
   a plurality of rods or sections of equipment extending through the wellbore and exposed to mechanical friction to be measured;
   a sensing device comprising at least one load sensor and at least one position sensor configured to obtain multiple measurements, at synchronized points in time, correlating load and position of said plurality of rods or sections of equipment, wherein said time synchronized measurements are repeated after a rod or section of equipment is added or removed from the plurality of rods or sections of equipment;
   a processor configured to:
      determine acceleration of dynamic motion of the plurality of rods or sections of equipment based on the measurements made by the sensing device;
      determine loads attributed to friction by eliminating loads attributed to the determined acceleration of the plurality of rods or sections of equipment each time a rod or section of equipment is added or removed from the plurality of rods or sections of equipment;
      determine cumulative friction-induced tensile forces acting over the plurality of rods or sections of equipment, moving within the wellbore; and
      create a friction map of the wellbore based on the determined cumulative friction-induced tensile forces.

2. The apparatus of claim 1, wherein the sensing device is located on a service rig lifting assembly or are in-line with the plurality of rods or sections of equipment to provide a direct measure of time synchronized load and position of a segment of the plurality of rods or sections of equipment; and material properties of the plurality, of rods or sections of equipment are known, but downhole friction conditions are not initially known.

3. The apparatus of claim 2, wherein the sensing device comprises a load-cell and at least one of: an accelerometer, a gyroscope, a barometer, a magnetometer, a rotary encoder, a string potentiometer, a laser distance sensor, a sonic distance sensor, or combinations thereof.

4. The apparatus of claim 3, wherein the sensing device is configured to determine an upper point and a lower point at which an applied tensile lifting force significantly changes, indicating that the plurality of rods or plurality of sections of equipment weight is transferred on to, or away from, the lifting assembly, and
   wherein the processor calibrates the position sensor to known vertical positions and known distances apart, and
   wherein the processor identifies travel direction of the plurality of rods or sections of equipment as rods or sections of equipment are installed on or removed from the wellbore as the applied tensile lifting force change arrives at or leaves the upper point or the lower point.

5. The apparatus of claim 3, further comprising:
   a dynamic motions sensor configured to determine and eliminate dynamic load variations from processed sensor data that are not directly attributed to mechanical friction, and
   wherein the sensing device is disposed in-line with a rod of the plurality of rods or a section of plurality of sections of equipment and is configured to travel through the wellbore to measure forces close to point(s) of downhole friction.

6. The apparatus of claim 5, further comprising:
   one or more magnetometers configured to determine velocity as the sensing device passes ferrous variations, such as a tubing coupling,
   wherein said one or more magnetometers are further configured to correlate known positions of said ferrous variations within the wellbore by counting each sensed ferrous variation along a traveling path of the sensing device, and
   wherein said one or more magnetometers are configured to calibrate an accelerometer for a position and a velocity at each said ferrous variation.

7. The apparatus of claim 3, wherein the sensing device measurements are stored for further processing and analysis, and
   wherein the processor removes dynamic motion and dynamic loads to reveal friction acting at various depths along the wellbore by comparing the multiple measurements on the plurality of rods or sections of equipment as the plurality of rods or sections of equipment change in length due to the addition or removal of rods or sections of equipment in the wellbore.

8. The apparatus of claim 3, further comprising:
   a data link,
   wherein the sensing device measurements are processed and transmitted to a user during the workover or wireline procedure,
   wherein alarms or historical logs are generated based on when particular dynamic conditions are met, and
   wherein the processor is further configured to compute and transmit statistics comprising:
      peak and average velocities, current and previous loading, overloading, underloading, equipment counts, equipment handling time, or determined friction.

9. The apparatus of claim 1, wherein the sensing device incorporates a well automation controller, or pump-off controller, or a variable frequency drive system of a pumping well, or a prescribed workover procedure configured to:
  periodically enter a slow-pull mode where a pumping unit or workover rig is temporarily operated at a minimally acceptable speed in order to determine a quantifiable stretch of the plurality of rods or sections of equipment under increasing tensile loads, while held stationary by a distant point of static downhole friction;
  determine a spring constant of the plurality of rods or sections of equipment, with a known elastic constant, based on a change in applied force over a relative change in position of the plurality of rods or sections of equipment; and
  determine a magnitude and location of said distant point of static downhole friction as it changes across subsequent measurements over time.

10. A method for measuring downhole friction in a wellbore during a workover or wireline procedure, comprising:
  inserting or removing a plurality of rods or sections of equipment extending through the wellbore and exposed to mechanical friction;
  measuring at least one load acting on the plurality of rods or sections of equipment;
  measuring at least one position of a load acting on the plurality of rods or sections of equipment;
  wherein the at least one load measurement and the at least one position measurements are synchronized in time to determine dynamic accelerations along a lifting system, the plurality of rods or sections of equipment; and
  a processor configured to:
    determine acceleration of dynamic motion of the plurality of rods or sections of equipment based on the measurements made by the sensing device;
    determine loads attributed to friction by eliminating loads attributed to the determined acceleration of the plurality of rods or sections of equipment each time a rod or section of equipment is inserted or removed from the plurality of rods or sections of equipment;
    determine cumulative friction-induced tensile forces acting over the plurality of rods or sections of equipment, moving within the wellbore; and
    create a friction map of the wellbore based on the determined cumulative friction-induced tensile forces.

11. The method of claim 10, further comprising the step of:
  normalizing the measured loads and positions in order to remove dynamic motion effects; and
  producing a cumulative measure of friction acting on the plurality of rods or sections of equipment based on the normalized measured loads and positions.

12. The method of claim 11, further comprising the steps of:
  repeating the step of measuring at least one load acting on the plurality of rods or sections of equipment and repeating the step of measuring at least one position of a load acting on the plurality of rods or sections of equipment each time a rod or section of equipment is inserted or removed from the plurality of rods or sections of equipment, resulting, in a different length of plurality of rods or sections of equipment,
  data is normalized by calculating loads not attributed to dynamic acceleration and compared to material properties of the plurality of rods or sections of equipment, and a new cumulative measure of friction acting on the plurality of rods or sections of equipment is determined.

13. The method of claim 12, further comprising the steps of:
  producing a mapping of friction properties vs. depth in the wellbore by comparing cumulative measures of friction acting on each different length of plurality of rods or sections of equipment.

14. The method of claim 13, further comprising:
  correlating the mapping to a predetermined geometry of the wellbore to improve the accuracy of a friction model of the wellbore;
  utilizing determined contact points of the plurality of rods or sections of equipment at specified depths to improve overall wellbore trajectory; and
  determining possible inaccuracies in the wellbore geometry based on the mapping.

15. The method of claim 10, wherein the steps of measuring at least one load acting on the plurality of rods or sections of equipment and measuring at last one position of a load acting on the plurality of rods or sections of equipment further comprises:
  slowly increasing an applied load lifting force on the plurality of rods or sections of equipment and measuring a static or transitional friction acting at a specific depth;
  causing a subset length of rods or sections of equipment between a measurement location and a distant point of friction, to stretch;
  determining a depth of said distant point friction by correlating known elasticity properties of the plurality of the subset length of rods or sections of equipment to the applied load and a measured stretch at a point when the distant point of friction is overcome; and
  quantifying the magnitude of the distant point of friction based on the applied load and an amount of stretch at which the downhole static friction is overcome and the rods begin to move passed the distant point of friction.

16. The method of claim 15, wherein the subset length of rods or sections of equipment remains constant, hut the load and position measurements are performed along the wellbore, the method further comprising:
  recording conditions acting on the subset length of rods or sections of equipment while exposed to downhole friction dynamics;
  normalizing the measured loads and measured positions acting on the plurality of rods or sections of equipment; and
  determining friction acting at specific depths along the wellbore determined from the normalized measured loads and normalized measured positions.

17. The method of claim 10, further comprising the steps of:
  reporting dynamic motion and frictional forces acting on the plurality of rods or sections of equipment to a remote device;
  identifying dynamic conditions that exceed predefined thresholds; and
  reporting statistics comprising: peak and average velocities, detailed equipment loading, equipment counts, determined friction, average time to handle a piece of equipment, work stoppages, or overall work time to a remote device.

* * * * *